United States Patent
Sprouse et al.

(10) Patent No.: US 9,952,978 B2
(45) Date of Patent: Apr. 24, 2018

(54) METHOD FOR IMPROVING MIXED RANDOM PERFORMANCE IN LOW QUEUE DEPTH WORKLOADS

(71) Applicant: SanDisk Enterprise IP LLC, Milpitas, CA (US)

(72) Inventors: Steven Sprouse, San Jose, CA (US); Satish B. Vasudeva, Fremont, CA (US); Rodney Brittner, San Jose, CA (US)

(73) Assignee: SANDISK TECHNOLOGIES, LLC, Plano, TX (US)

( * ) Notice: Subject to any disclaimer, the term of this patent is extended or adjusted under 35 U.S.C. 154(b) by 0 days.

(21) Appl. No.: 14/677,662

(22) Filed: Apr. 2, 2015

(65) Prior Publication Data

US 2016/0117253 A1    Apr. 28, 2016

Related U.S. Application Data

(60) Provisional application No. 62/069,241, filed on Oct. 27, 2014.

(51) Int. Cl.
*G06F 12/12*      (2016.01)
*G06F 12/00*      (2006.01)
(Continued)

(52) U.S. Cl.
CPC ...... *G06F 12/0868* (2013.01); *G06F 12/0246* (2013.01); *G06F 2212/1041* (2013.01)

(58) Field of Classification Search
CPC .............. G06F 12/0246; G06F 12/10; G06F 2212/2022; G06F 3/0689; G06F 12/0292;
(Continued)

(56) References Cited

U.S. PATENT DOCUMENTS

| 4,586,167 A | 4/1986 | Fujishima et al. |
| 5,559,988 A | 9/1996 | Durante et al. |

(Continued)

FOREIGN PATENT DOCUMENTS

| EP | 0 376 285 A2 | 7/1990 |
| WO | WO 2012/083308 | 6/2012 |

OTHER PUBLICATIONS

International Search Report and Written Opinion dated Nov. 18, 2015, received in International Patent Application No. PCT/US2015/039552 which corresponds to U.S. Appl. No. 14/559,183, 11 pages (Ellis).

(Continued)

*Primary Examiner* — David X Yi
*Assistant Examiner* — Candice Rankin
(74) *Attorney, Agent, or Firm* — Morgan, Lewis & Bockius LLP (57) ABSTRACT

Systems, methods and or devices are used to enable improving mixed random performance in low queue depth workloads in a storage device (e.g., comprising a plurality of non-volatile memory units, such as one or more flash memory devices). In one aspect, the method includes (1) maintaining a write cache corresponding to write commands from a host, (2) determining a workload in accordance with commands from the host, (3) in accordance with a determination that the workload is a non-qualifying workload, scheduling a regular flush of the write cache, and (4) in accordance with a determination that the workload is a qualifying workload, scheduling an optimized flush of the write cache.

21 Claims, 4 Drawing Sheets

(51) Int. Cl.
*G06F 12/0868* (2016.01)
*G06F 12/02* (2006.01)

(58) Field of Classification Search
CPC ........... G06F 2212/205; G06F 12/0815; G06F 2212/7202; G06F 2212/222; G06F 11/1064; G06F 12/0804; G06F 12/0891; G06F 12/0866; G06F 12/0897; G06F 12/0808; G06F 3/06; G06F 3/0688; G06F 12/12; G06F 12/121; G06F 12/0868
See application file for complete search history.

(56) References Cited

U.S. PATENT DOCUMENTS

| | | |
|---|---|---|
| 5,909,559 A | 6/1999 | So |
| 6,247,136 B1 | 6/2001 | MacWilliams et al. |
| 6,292,410 B1 | 9/2001 | Yi et al. |
| 6,401,213 B1 | 6/2002 | Jeddeloh |
| 6,449,709 B1 | 9/2002 | Gates |
| 6,952,682 B1 | 10/2005 | Wellman |
| 7,969,809 B2 | 6/2011 | Ben-Rubi |
| 8,010,738 B1 | 8/2011 | Chilton et al. |
| 8,122,202 B2 | 2/2012 | Gillingham |
| 8,213,255 B2 | 7/2012 | Hemink et al. |
| 8,255,618 B1 | 8/2012 | Borchers et al. |
| 8,321,627 B1 | 11/2012 | Norrie et al. |
| 8,429,498 B1 | 4/2013 | Anholt et al. |
| 8,479,080 B1 | 7/2013 | Shalvi et al. |
| 8,539,139 B1 | 9/2013 | Morris |
| 8,595,590 B1 | 11/2013 | Vojcic et al. |
| 8,775,720 B1 | 7/2014 | Meyer et al. |
| 8,825,967 B2 | 9/2014 | Hong Beom |
| 8,874,836 B1 | 10/2014 | Hayes et al. |
| 8,886,872 B1 | 11/2014 | Norrie |
| 8,924,661 B1 | 12/2014 | Shachar et al. |
| 8,984,376 B1 | 3/2015 | Norrie |
| 9,128,825 B1 | 9/2015 | Albrecht et al. |
| 9,170,876 B1 | 10/2015 | Bates et al. |
| 9,176,971 B2 | 11/2015 | Shapiro |
| 9,214,965 B2 | 12/2015 | Fitzpatrick et al. |
| 9,606,737 B2 | 3/2017 | Kankani et al. |
| 9,639,282 B2 | 5/2017 | Kankani et al. |
| 2003/0115403 A1 | 6/2003 | Bouchard et al. |
| 2003/0122834 A1 | 7/2003 | Mastronarde et al. |
| 2004/0117441 A1* | 6/2004 | Liu .................... G06F 12/0888 709/203 |
| 2005/0144361 A1 | 6/2005 | Gonzalez et al. |
| 2005/0248992 A1 | 11/2005 | Hwang et al. |
| 2007/0002629 A1 | 1/2007 | Lee et al. |
| 2007/0156998 A1 | 7/2007 | Gorobets |
| 2007/0233937 A1 | 10/2007 | Coulson et al. |
| 2008/0140914 A1 | 6/2008 | Jeon |
| 2008/0147994 A1 | 6/2008 | Jeong et al. |
| 2008/0235466 A1 | 9/2008 | Traister |
| 2008/0235480 A1 | 9/2008 | Traister |
| 2008/0291204 A1 | 11/2008 | Korupolu et al. |
| 2008/0295094 A1 | 11/2008 | Korupolu et al. |
| 2009/0168525 A1 | 7/2009 | Olbrich et al. |
| 2009/0177943 A1 | 7/2009 | Silvus et al. |
| 2009/0222627 A1* | 9/2009 | Reid .................... G06F 12/0804 711/135 |
| 2009/0282191 A1 | 11/2009 | Depta |
| 2010/0005217 A1 | 1/2010 | Jeddeloh |
| 2010/0014364 A1 | 1/2010 | Laberge et al. |
| 2010/0082879 A1 | 4/2010 | McKean et al. |
| 2010/0165730 A1 | 7/2010 | Sommer et al. |
| 2010/0174845 A1 | 7/2010 | Gorobets et al. |
| 2010/0174853 A1 | 7/2010 | Lee et al. |
| 2010/0220509 A1 | 9/2010 | Sokolov et al. |
| 2010/0250874 A1 | 9/2010 | Farrell et al. |
| 2011/0113204 A1 | 5/2011 | Henriksson et al. |
| 2011/0138100 A1 | 6/2011 | Sinclair |
| 2011/0235434 A1 | 9/2011 | Byom et al. |
| 2011/0252215 A1 | 10/2011 | Franceschini et al. |
| 2011/0264851 A1 | 10/2011 | Jeon et al. |
| 2011/0302474 A1 | 12/2011 | Goss et al. |
| 2012/0030408 A1 | 2/2012 | Flynn et al. |
| 2012/0047317 A1 | 2/2012 | Yoon et al. |
| 2012/0159070 A1 | 6/2012 | Baderdinni et al. |
| 2012/0198129 A1 | 8/2012 | Van Aken et al. |
| 2012/0224425 A1 | 9/2012 | Fai et al. |
| 2012/0278530 A1 | 11/2012 | Ebsen |
| 2012/0324180 A1 | 12/2012 | Asnaashari et al. |
| 2013/0007380 A1 | 1/2013 | Seekins et al. |
| 2013/0070507 A1 | 3/2013 | Yoon |
| 2013/0111112 A1 | 5/2013 | Jeong et al. |
| 2013/0111289 A1 | 5/2013 | Zhang et al. |
| 2013/0111290 A1 | 5/2013 | Zhang et al. |
| 2013/0132650 A1 | 5/2013 | Choi et al. |
| 2013/0182506 A1 | 7/2013 | Melik-Martirosian |
| 2013/0219106 A1 | 8/2013 | Vogan et al. |
| 2013/0232290 A1 | 9/2013 | Ish et al. |
| 2013/0254498 A1 | 9/2013 | Adachi et al. |
| 2013/0262745 A1 | 10/2013 | Lin et al. |
| 2013/0297894 A1 | 11/2013 | Cohen et al. |
| 2013/0346805 A1 | 12/2013 | Sprouse et al. |
| 2014/0006688 A1 | 1/2014 | Yu et al. |
| 2014/0013026 A1 | 1/2014 | Venkata et al. |
| 2014/0047170 A1 | 2/2014 | Cohen et al. |
| 2014/0075100 A1 | 3/2014 | Kaneko et al. |
| 2014/0143637 A1 | 5/2014 | Cohen et al. |
| 2014/0148175 A1 | 5/2014 | Luo |
| 2014/0173239 A1 | 6/2014 | Schushan |
| 2014/0229655 A1 | 8/2014 | Goss et al. |
| 2014/0229656 A1 | 8/2014 | Goss et al. |
| 2014/0241071 A1 | 8/2014 | Goss et al. |
| 2014/0244897 A1 | 8/2014 | Goss et al. |
| 2014/0244899 A1 | 8/2014 | Schmier et al. |
| 2014/0258598 A1 | 9/2014 | Canepa et al. |
| 2014/0281833 A1 | 9/2014 | Kroeger et al. |
| 2014/0310241 A1 | 10/2014 | Goyen |
| 2014/0379988 A1* | 12/2014 | Lyakhovitskiy ........ G06F 12/12 711/133 |
| 2015/0067172 A1 | 3/2015 | Ashokan et al. |
| 2015/0074487 A1 | 3/2015 | Patapoutian et al. |
| 2015/0095558 A1 | 4/2015 | Kim et al. |
| 2015/0113206 A1 | 4/2015 | Fitzpatrick et al. |
| 2015/0186278 A1* | 7/2015 | Jayakumar .......... G06F 12/0804 711/103 |
| 2015/0234612 A1 | 8/2015 | Himelstein et al. |
| 2015/0261473 A1 | 9/2015 | Matsuyama et al. |
| 2015/0262632 A1* | 9/2015 | Shelton ............... G06F 12/0246 711/103 |
| 2015/0301749 A1 | 10/2015 | Seo et al. |
| 2015/0331627 A1 | 11/2015 | Kwak |
| 2016/0026386 A1 | 1/2016 | Ellis et al. |
| 2016/0034194 A1 | 2/2016 | Brokhman et al. |
| 2016/0062699 A1 | 3/2016 | Samuels et al. |
| 2016/0070493 A1 | 3/2016 | Oh et al. |
| 2016/0071612 A1 | 3/2016 | Takizawa et al. |
| 2016/0117099 A1 | 4/2016 | Prins et al. |
| 2016/0117102 A1 | 4/2016 | Hong et al. |
| 2016/0117105 A1 | 4/2016 | Thangaraj et al. |
| 2016/0117252 A1 | 4/2016 | Thangaraj et al. |
| 2016/0170671 A1 | 6/2016 | Huang |
| 2016/0170831 A1 | 6/2016 | Lesartre et al. |
| 2016/0179403 A1 | 6/2016 | Kurotsuchi et al. |
| 2016/0210060 A1 | 7/2016 | Dreyer |
| 2016/0299689 A1 | 10/2016 | Kim et al. |
| 2016/0299699 A1 | 10/2016 | Vanaraj et al. |
| 2016/0299704 A1 | 10/2016 | Vanaraj et al. |
| 2016/0299724 A1 | 10/2016 | Vanaraj et al. |
| 2016/0342344 A1 | 11/2016 | Kankani et al. |
| 2016/0342345 A1 | 11/2016 | Kankani et al. |
| 2016/0371394 A1 | 12/2016 | Shahidi et al. |

OTHER PUBLICATIONS

International Search Report and Written Opinion dated Nov. 9, 2015, received in International Patent Application No. PCT/US2015/053551, which corresponds to U.S. Appl. No. 14/668,690, 12 pages (Thangaraj).

(56) References Cited

OTHER PUBLICATIONS

International Search Report and Written Opinion dated Nov. 11, 2015, received in International Patent Application No. PCT/US2015/053582, which corresponds to U.S. Appl. No. 14/659,493, 12 pages (Prins).
Atmel Data-sheet, "9-to-bit Selectable, ±0.5° C. Accurate Digital Temperature Sensor with Nonvolatile Registers and Serial EEPROM" www.atmel.com/images/Atmel-8854-DTS-AT30TSE752A-754A-758A-Datasheet.pdf, Atmel Data-sheet, Mar. 1, 2011, -Atmel-8854-DTS-AT30TSE752A-754A-758A-Datasheet_102014, 57 pages.
Seagate Technology, "SCSI Commands Reference Manual, Rev. C", Product Manual dated Apr. 2010, pp. 211-214.
Tanenbaum, "Structured Computer Organization", 3rd edition 1990, section 1.4, p. 11, 3 pages.
International Search Report and Written Opinion dated Jul. 4, 2016, received in International Patent Application No. PCT/US2016/028477, which corresponds to U.S. Appl. No. 14/883,540, 11 pages (Hodgdon).
International Search Report and Written Opinion dated Sep. 8, 2016, received in International Patent Application No. PCT/US2016/036716, which corresponds to U.S. Appl. No. 14/925,945, 13 pages (Ellis).
International Preliminary Report on Patentability dated May 2, 2017, received in International Patent Application No. PCT/US2015/053551, which corresponds to U.S. Appl. No. 14/668,690, 8 pages (Thangaraj).
International Preliminary Report on Patentability dated May 2, 2017, received in International Patent Application No. PCT/US2015/053582, which corresponds to U.S. Appl. No. 14/659,493, 7 pages (Prins).

\* cited by examiner

Figure 3B

METHOD FOR IMPROVING MIXED RANDOM PERFORMANCE IN LOW QUEUE DEPTH WORKLOADS

RELATED APPLICATIONS

This application claims priority to U.S. Provisional Application No. 62/069,241, filed Oct. 27, 2014, which is hereby incorporated by reference in its entirety.

TECHNICAL FIELD

The disclosed embodiments relate generally to memory systems, and in particular, to improving mixed random performance in low queue depth workloads in a storage device (e.g., comprising one or more flash memory devices).

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information.

Since some memory commands (e.g., read and/or write commands) need to be completed within a predefined amount of time (e.g., to meet qualification requirements), it is important to optimize memory management processes to enhance performance of memory devices.

SUMMARY

Various embodiments of systems, methods, and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various embodiments are used to enable improving mixed random performance in low queue depth workloads. In one aspect, in accordance with a determination that a workload is a non-qualifying workload, a regular flush of a write cache is scheduled and in accordance with a determination that the workload is a qualifying workload, an optimized flush of the write cache is scheduled.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various embodiments described herein include systems, methods, and/or devices used to enable improving mixed random performance in low queue depth workloads. Some embodiments include systems, methods and/or devices to schedule a regular flush of a write cache in accordance with a determination that a workload is a non-qualifying workload and to schedule an optimized flush of the write cache in accordance with a determination that the workload is a qualifying workload.

(A1) More specifically, some embodiments include a method of managing a storage system. In some embodiments, the method includes (1) maintaining a write cache corresponding to write commands from a host to which a storage device of the storage system is operatively coupled, the storage device including a plurality of non-volatile memory units, wherein the write cache includes write commands from the host that are mapped for storage in the plurality of non-volatile memory units but not yet saved to the non-volatile memory units, (2) determining a workload in accordance with commands from the host to which the storage device is operatively coupled, (3) in accordance with a determination that the workload is a non-qualifying workload, scheduling a regular flush of the write cache, wherein the regular flush includes flushing from the write cache a predefined amount of data to one non-volatile memory unit of the plurality of non-volatile memory units, and (4) in accordance with a determination that the workload is a qualifying workload, scheduling an optimized flush of the write cache, wherein the optimized flush includes flushing a first multiple of the predefined amount of data to a corresponding number of the plurality of non-volatile memory units, wherein the first multiple is an integer greater than one.

(A2) In some embodiments of the method of A1, the regular flush includes accruing enough data from write commands to write the predefined amount of data to the one non-volatile memory unit of the plurality of non-volatile memory units, and the optimized flush includes accruing enough data from write commands to write the first multiple of the predefined amount of data to the corresponding number of the plurality of non-volatile memory units.

(A3) In some embodiments of the method of any of A1 to A2, the method further includes, subsequent to determining that the workload has changed from a qualifying workload to a non-qualifying workload, performing one or more regular flushes, each regular flush including flushing from the write cache the predefined amount of data to one non-volatile memory unit of the plurality of non-volatile memory units.

(A4) In some embodiments of the method of A3, performing the one or more regular flushes includes performing a plurality of regular flushes in parallel.

(A5) In some embodiments of the method of any of A1 to A4, the method further includes, in accordance with a determination that the host has been idle for at least a predefined amount of time, flushing the write cache to one or more of the plurality of non-volatile memory units.

(A6) In some embodiments of the method of any of A1 to A4, the method further includes, in accordance with a determination that the host has been idle for at least a predefined amount of time, and in accordance with a determination that the write cache contains at least a non-zero integer multiple of the predefined amount of data, flushing the non-zero integer multiple of the predefined amount of data to one or more of the plurality of non-volatile memory units.

(A7) In some embodiments of the method of any of A1 to A6, the storage device comprises one or more flash memory devices.

(A8) In another aspect, a storage device includes (1) non-volatile memory (e.g., comprising one or more non-volatile storage devices, such as flash memory devices), (2) one or more processors, and (3) controller memory (e.g., non-volatile memory or volatile memory in or coupled to the controller) storing one or more programs, which when executed by the one or more processors cause the storage device to perform or control performance of any of the methods A1 to A7 described herein.

(A10) In yet another aspect, any of the methods A1 to A7 described above are performed by a storage device including means for performing any of the methods described herein.

(A12) In yet another aspect, a storage system includes (1) a storage medium (e.g., comprising one or more non-volatile storage devices, such as flash memory devices) (2) one or more processors, and (3) memory (e.g., non-volatile memory or volatile memory in the storage system) storing one or more programs, which when executed by the one or more processors cause the storage system to perform or control performance of any of the methods A1 to A7 described herein.

(A13) In yet another aspect, some embodiments include a non-transitory computer readable storage medium, storing one or more programs configured for execution by one or more processors of a storage device, the one or more programs including instructions for performing any of the methods described herein.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure pertinent aspects of the embodiments described herein.

Data storage systems, including those described below, use a variety of techniques to avoid data loss caused by a variety of failure mechanisms, including storage media failure, communication failures, and failures at the system and subsystem level. A common feature of these mechanisms is the use of data redundancy to protect data, to compensate for actual and potential data errors (e.g., media errors, lost data, transmission errors, inaccessible data, etc.). One class of redundancy mechanisms is known as error correction codes (ECCs). Numerous types of error correction codes are well known (e.g., BCH, LDPC, Reed-Solomon, etc.), as are numerous schemes for storing them with or in conjunction with the data that is being protected. Another class of redundancy mechanisms is erasure codes (e.g., pyramid, fountain, partial MDS, locally repairable, simple regenerating, etc.)

Another type or level of redundancy mechanism is typically called RAID (redundant array of independent disks), even when the storage media are not "disks" in the traditional sense. There are multiple forms of RAID, or RAID schemes, providing different levels of data protection (e.g., RAID-1, RAID-5, RAID-6, RAID-10, etc.). Typically, in systems that use RAID, "stripes" of data stored in multiple distinct storage locations are treated as a set, and stored with sufficient redundant data that any data in a stripe that would have been lost, in a partial or complete failure of any one of the storage locations, is recovered using the other data in the stripe, possibly including the redundant data.

Figure 1:
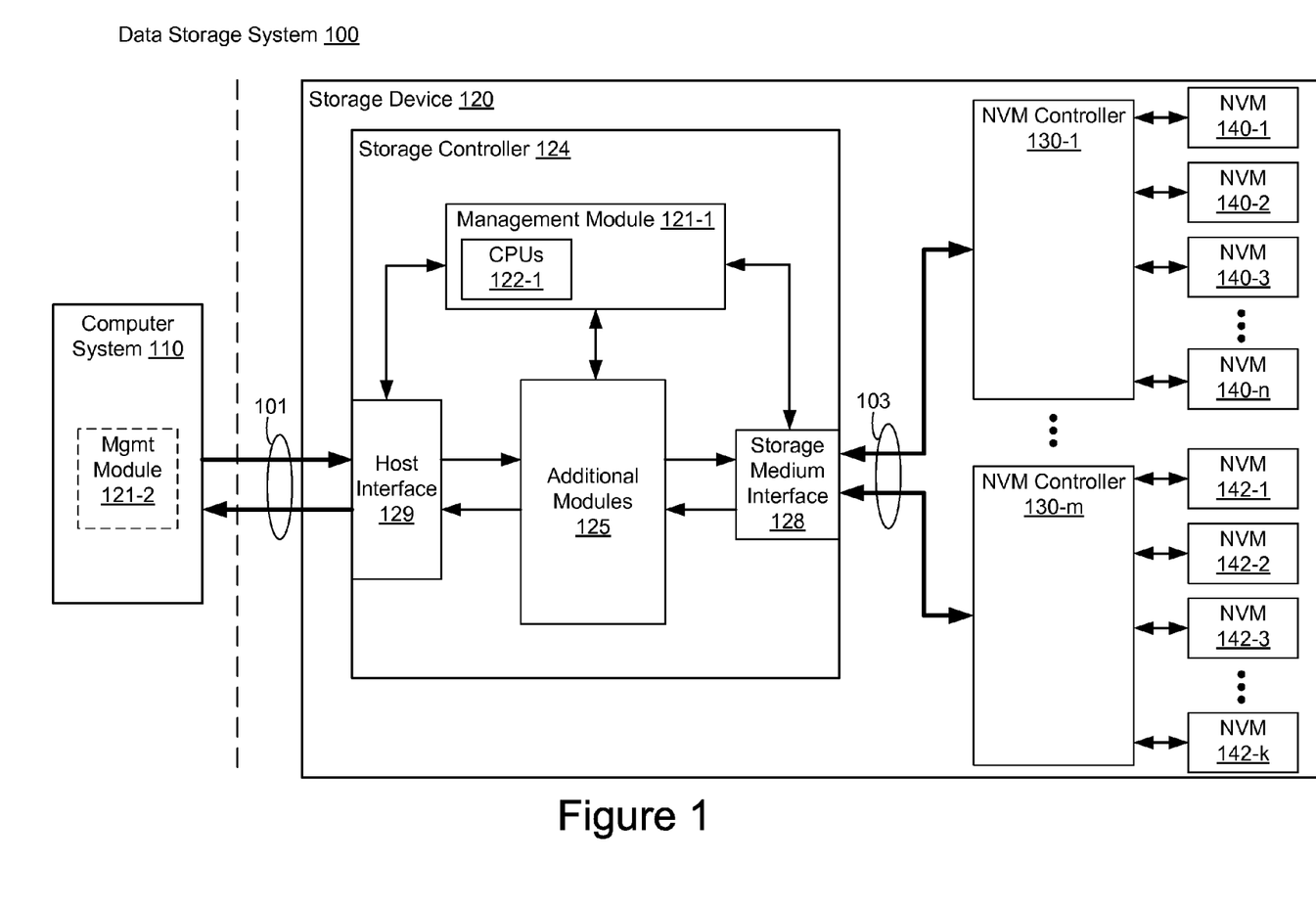
FIG. 1 is a block diagram illustrating an implementation of a data storage system, in accordance with some embodiments.

FIG. 1 is a block diagram illustrating data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes storage device 120 (also sometimes called an information storage device, or a data storage device, or a memory device), which includes storage controller 124, one or more non-volatile memory (NVM) controllers 130 such as flash controllers, and non-volatile memory (e.g., one or more NVM device(s) 140, 142 such as one or more flash memory devices), and is used in conjunction with computer system 110. In some embodiments, storage device 120 includes a single NVM device while in other embodiments storage device 120 includes a plurality of NVM devices. In some embodiments, NVM devices 140, 142 include NAND-type flash memory or NOR-type flash memory. Further, in some embodiments, NVM controllers 130 are solid-state drive (SSD) controllers. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, data storage system 100 can contain one or more storage device 120s.

Computer system 110 is coupled to storage controller 124 through data connections 101. However, in some embodiments computer system 110 includes storage controller 124, or a portion of storage controller 124, as a component and/or a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch screen display, a mouse, a track-pad, a digital camera, and/or any number of supplemental devices to add functionality. In some embodiments, computer system 110 does not have a display and other user interface components.

The one or more NVM controllers 130 are coupled with storage controller 124 through connections 103. Connections 103 are sometimes called data connections, but typically convey commands in addition to data, and optionally convey metadata, error correction information and/or other information in addition to data values to be stored in NVM devices 140, 142 and data values read from NVM devices 140, 142. In some embodiments, however, storage controller 124, the one or more NVM controllers 130, and NVM devices 140, 142 are included in the same device (i.e., an integrated device) as components thereof. Furthermore, in some embodiments, storage controller 124, the one or more NVM controllers 130, and NVM devices 140, 142 are embedded in a host device (e.g., computer system 110), such as a mobile device, tablet, other computer or computer controlled device, and the methods described herein are performed, at least in part, by the embedded storage controller.

In some embodiments, storage device 120 includes NVM devices 140, 142 such as flash memory devices (e.g., NVM devices 140-1 through 140-$n$, and NVM devices 142-1 through 142-$k$) and NVM controllers 130 (e.g., NVM controllers 130-1 through 130-$m$). Viewed another way, storage device 120 includes m memory channels, each of which has an NVM controller 130 and a set of NVM devices 140 or 142 coupled to the NVM controller 130, where m is an integer greater than one. However, in some embodiments, two or more memory channels share an NVM controller 130. In either example, each memory channel has its own distinct set of NVM devices 140 or 142. In a non-limiting example, the number of memory channels in a typical storage device is 8, 16 or 32. In another non-limiting example, the number of NVM devices 140 or 142 per memory channel is typically 8, 16, 32 or 64. Furthermore, in some embodiments, the number of NVM devices 140/142 is different in different memory channels.

In some embodiments, each NVM controller of NVM controllers 130 include one or more processing units (also sometimes called CPUs or processors or microprocessors or microcontrollers) configured to execute instructions in one or more programs (e.g., in NVM controllers 130). In some embodiments, the one or more processors are shared by one or more components within, and in some cases, beyond the function of NVM controllers 130. NVM devices 140, 142 are coupled to NVM controllers 130 through connections that typically convey commands in addition to data, and optionally convey metadata, error correction information and/or other information in addition to data values to be stored in NVM devices 140, 142 and data values read from NVM devices 140, 142. NVM devices 140, 142 may include any number (i.e., one or more) of memory devices including, without limitation, non-volatile semiconductor memory devices, such as flash memory device(s).

For example, flash memory device(s) (e.g., NVM devices 140, 142) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) (e.g., NVM devices 140, 142) can also be configured for relatively smaller-scale applications such as personal flash drives or hard-disk replacements for personal, laptop, and tablet computers. Although flash memory devices and flash controllers are used as an example here, in some embodiments storage device 120 includes other non-volatile memory device(s) and corresponding non-volatile storage controller(s).

In some embodiments, NVM devices 140, 142 are divided into a number of addressable and individually selectable blocks. In some embodiments, the individually selectable blocks are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

As noted above, while data storage densities of non-volatile semiconductor memory devices are generally increasing, a drawback of increasing storage density is that the stored data is more prone to being stored and/or read erroneously. In some embodiments, error control coding can be utilized to limit the number of uncorrectable errors that are introduced by electrical fluctuations, defects in the storage medium, operating conditions, device history, write-read circuitry, etc., or a combination of these and various other factors.

In some embodiments, storage controller 124 includes a management module 121-1, a host interface 129, a storage medium (I/O) interface 128, and additional module(s) 125. Storage controller 124 may include various additional features that have not been illustrated for the sake of brevity and so as not to obscure pertinent features of the example embodiments disclosed herein, and a different arrangement of features may be possible.

Host interface 129 provides an interface to computer system 110 through data connections 101. Similarly, storage medium interface 128 provides an interface to NVM controllers 130 though connections 103. In some embodiments, storage medium interface 128 includes read and write circuitry, including circuitry capable of providing reading signals to NVM controllers 130 (e.g., reading threshold voltages for NAND-type flash memory). In some embodiments, connections 101 and connections 103 are implemented as a communication media over which commands and data are communicated, using a protocol such as DDR3, SCSI, SATA, SAS, or the like. In some embodiments, storage controller 124 includes one or more processing units (also sometimes called CPUs or processors or microprocessors or microcontrollers) configured to execute instructions in one or more programs (e.g., in storage controller 124). In some embodiments, the one or more processors are shared by one or more components within, and in some cases, beyond the function of storage controller 124.

In some embodiments, management module 121-1 includes one or more processing units (CPUs, also sometimes called processors or microprocessors or microcontrollers) 122 configured to execute instructions in one or more programs (e.g., in management module 121-1). In some embodiments, the one or more CPUs 122 are shared by one or more components within, and in some cases, beyond the function of storage controller 124. Management module 121-1 is coupled to host interface 129, additional module(s) 125 and storage medium interface 128 in order to coordinate the operation of these components. In some embodiments, one or more modules of management module 121-1 are implemented in management module 121-2 of computer system 110. In some embodiments, one or more processors of computer system 110 (not shown) are configured to execute instructions in one or more programs (e.g., in management module 121-2). Management module 121-2 is coupled to storage device 120 in order to manage the operation of storage device 120.

Additional module(s) 125 are coupled to storage medium interface 128, host interface 129, and management module 121-1. As an example, additional module(s) 125 may include an error control module to limit the number of uncorrectable errors inadvertently introduced into data during writes to memory and/or reads from memory. In some embodiments, additional module(s) 125 are executed in software by the one or more CPUs 122 of management module 121-1, and, in other embodiments, additional module(s) 125 are implemented in whole or in part using special purpose circuitry (e.g., to perform encoding and decoding functions). In some embodiments, additional module(s) 125 are implemented in whole or in part by software executed on computer system 110.

In some embodiments, an error control module, included in additional module(s) 125, includes an encoder and a decoder. In some embodiments, the encoder encodes data by applying an error control code (ECC) to produce a codeword, which is subsequently stored in NVM devices 140, 142. When encoded data (e.g., one or more codewords) is read from NVM devices 140, 142, the decoder applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

In some embodiments, during a write operation, host interface 129 receives data to be stored in NVM devices 140, 142 from computer system 110. The data received by host interface 129 is made available to an encoder (e.g., in additional module(s) 125), which encodes the data to produce one or more codewords. The one or more codewords are made available to storage medium interface 128, which transfers the one or more codewords to NVM devices 140, 142 (e.g., through NVM controllers 130) in a manner dependent on the type of storage medium being utilized.

In some embodiments, a read operation is initiated when computer system (host) 110 sends one or more host read commands (e.g., via data connections 101, or alternatively a separate control line or bus) to storage controller 124 requesting data from NVM devices 140, 142. Storage controller 124 sends one or more read access commands to NVM devices 140, 142 (e.g., through NVM controllers 130), via storage medium interface 128, to obtain raw read data in accordance with memory locations (addresses) specified by the one or more host read commands. Storage medium interface 128 provides the raw read data (e.g., comprising one or more codewords) to a decoder (e.g., in additional module(s) 125). If the decoding is successful, the decoded data is provided to host interface 129, where the decoded data is made available to computer system 110. In some embodiments, if the decoding is not successful, storage controller 124 may resort to a number of remedial actions or provide an indication of an irresolvable error condition.

As explained above, a storage medium (e.g., NVM devices 140, 142) is divided into a number of addressable and individually selectable blocks and each block is optionally (but typically) further divided into a plurality of pages and/or word lines and/or sectors. While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called fast page), and (2) an upper page (sometimes called slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism) is a choice made when data is actually written to the storage media.

As an example, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written. Since flash memory can only be programmed and erased a limited number of times, the efficiency of the algorithm used to pick the next block(s) to re-write and erase has a significant impact on the lifetime and reliability of flash-based storage systems.

Write amplification is a phenomenon where the actual amount of physical data written to a storage medium (e.g., NVM devices 140, 142 in storage device 120) is a multiple of the logical amount of data written by a host (e.g., computer system 110, sometimes called a host) to the storage medium. As discussed above, when a block of storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by equation:

$$\frac{\text{amount of data written to a storage medium}}{\text{amount of data written by a host}}$$

One of the goals of any flash memory based data storage system architecture is to reduce write amplification as much as possible so that available endurance is used to meet storage medium reliability and warranty specifications. Higher system endurance also results in lower cost as the storage system may need less over-provisioning. By reducing write amplification, the endurance of the storage medium is increased and the overall cost of the storage system is decreased. Generally, garbage collection is performed on erase blocks with the fewest number of valid pages for best performance and best write amplification.

Flash memory devices utilize memory cells to store data as electrical values, such as electrical charges or voltages. Each flash memory cell typically includes a single transistor with a floating gate that is used to store a charge, which modifies the threshold voltage of the transistor (i.e., the voltage needed to turn the transistor on). The magnitude of the charge, and the corresponding threshold voltage the charge creates, is used to represent one or more data values. In some embodiments, during a read operation, a reading threshold voltage is applied to the control gate of the transistor and the resulting sensed current or voltage is mapped to a data value.

The terms "cell voltage" and "memory cell voltage," in the context of flash memory cells, means the threshold voltage of the memory cell, which is the minimum voltage that needs to be applied to the gate of the memory cell's transistor in order for the transistor to conduct current. Similarly, reading threshold voltages (sometimes also called reading signals and reading voltages) applied to a flash memory cells are gate voltages applied to the gates of the flash memory cells to determine whether the memory cells conduct current at that gate voltage. In some embodiments, when a flash memory cell's transistor conducts current at a given reading threshold voltage, indicating that the cell voltage is less than the reading threshold voltage, the raw data value for that read operation is a "1" and otherwise the raw data value is a "0."

Figure 2:
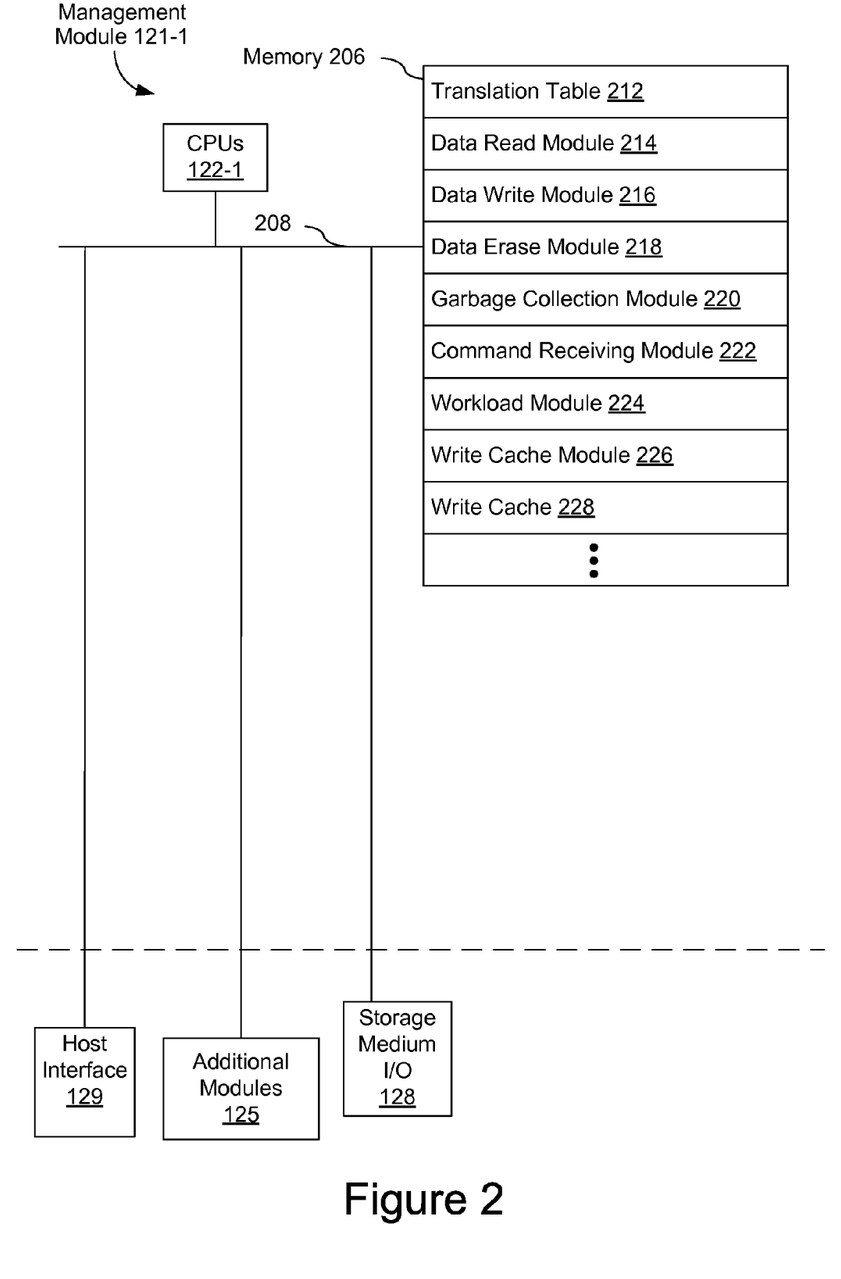
FIG. 2 is a block diagram illustrating an implementation of a management module, in accordance with some embodiments.

FIG. 2 is a block diagram illustrating a management module 121-1, in accordance with some embodiments, as shown in FIG. 1. Management module 121-1 typically includes one or more processing units (sometimes called CPUs or processors) 122-1 for executing modules, programs and/or instructions stored in memory 206 and thereby performing processing operations, memory 206 (sometimes called controller memory), and one or more communication buses 208 for interconnecting these components. The one or more communication buses 208 optionally include circuitry (sometimes called a chipset) that interconnects and controls communications between system components. Management module 121-1 is coupled to host interface 129, additional module(s) 125, and storage medium I/O 128 by the one or more communication buses 208. Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from the CPU(s) 122-1. Memory 206, or alternatively the non-volatile memory device(s) within memory 206, comprises a non-transitory computer readable storage medium. In some embodiments, memory 206, or the non-transitory computer readable storage medium of memory 206 stores the following programs, modules, and data structures, or a subset or superset thereof:

- translation table 212 that is used for mapping logical addresses to physical addresses;
- data read module 214 that is used for reading data from one or more codewords, pages or blocks in a storage medium (e.g., NVM devices 140, 142, FIG. 1);
- data write module 216 that is used for writing data to one or more codewords, pages or blocks in a storage medium (e.g., NVM devices 140, 142, FIG. 1);
- data erase module 218 that is used for erasing data from one or more blocks in a storage medium (e.g., NVM devices 140, 142, FIG. 1);
- garbage collection module 220 that is used for garbage collection for one or more blocks in a storage medium (e.g., NVM devices 140, 142, FIG. 1);
- command receiving module 222 that is used for receiving a plurality of commands (e.g., un-map commands and I/O commands such as write requests and/or read requests) from a host;
- workload module 224 that is used for determining a workload (or changes in the workload) in accordance with commands from a host (e.g., computer system 110, FIG. 1);
- write cache module 236 that is used for maintaining, flushing and/or scheduling a flush (e.g., a regular flush and/or an optimized flush) of a write cache (e.g., write cache 238); and
- write cache 238 that includes a collection of data structures corresponding to write commands from a host.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing some of the methods described below. In some embodiments, some or all of these modules may be implemented with specialized hardware circuits that subsume part or all of the module functionality.

Although FIG. 2 shows management module 121-1 in accordance with some embodiments, FIG. 2 is intended more as a functional description of the various features which may be present in management module 121-1 than as a structural schematic of the embodiments described herein. In practice, and as recognized by those of ordinary skill in the art, the programs, modules, and data structures shown separately could be combined and some programs, modules, and data structures could be separated.

In some embodiments, for a mixed read/write random workload (e.g., 30% writes and 70% reads) with a low queue depth (e.g., queue depth of 4), write commands from a host can block read commands from the host since write operations are slower (e.g., take significantly longer to complete) than read operations, causing the host to continuously stall while waiting for writes to complete. The various embodiments described herein include systems, methods and/or devices used to enable improving mixed random performance in low queue depth workloads (sometimes called qualifying workloads). In some embodiments, the storage device comprising one or more non-volatile memory devices (e.g., NVM devices 140, 142, FIG. 1) operates in either a first mode (e.g., read mode) or a second mode (e.g., write mode). In some embodiments, during the read mode, all writes (e.g., both host writes and garbage collection writes) are buffered in a capacitor backed RAM (e.g., DRAM or SRAM, sometimes called a write cache) until a predetermined criteria is met (e.g., until the buffer is full, until enough data has accrued to complete a RAID stripe, etc.). During this time, read commands are serviced quickly since there are no blocking write operations. In some embodiments, when the predetermined criteria is met (e.g., when the buffer is full, when enough data has accrued to complete a RAID stripe, etc.), the storage device switches to the write mode, during which the storage device issues as many writes in parallel as possible, taking into account any system level power constraints. Any reads issued when the storage device is in the write mode will be blocked until the writes complete.

Figure 3A:
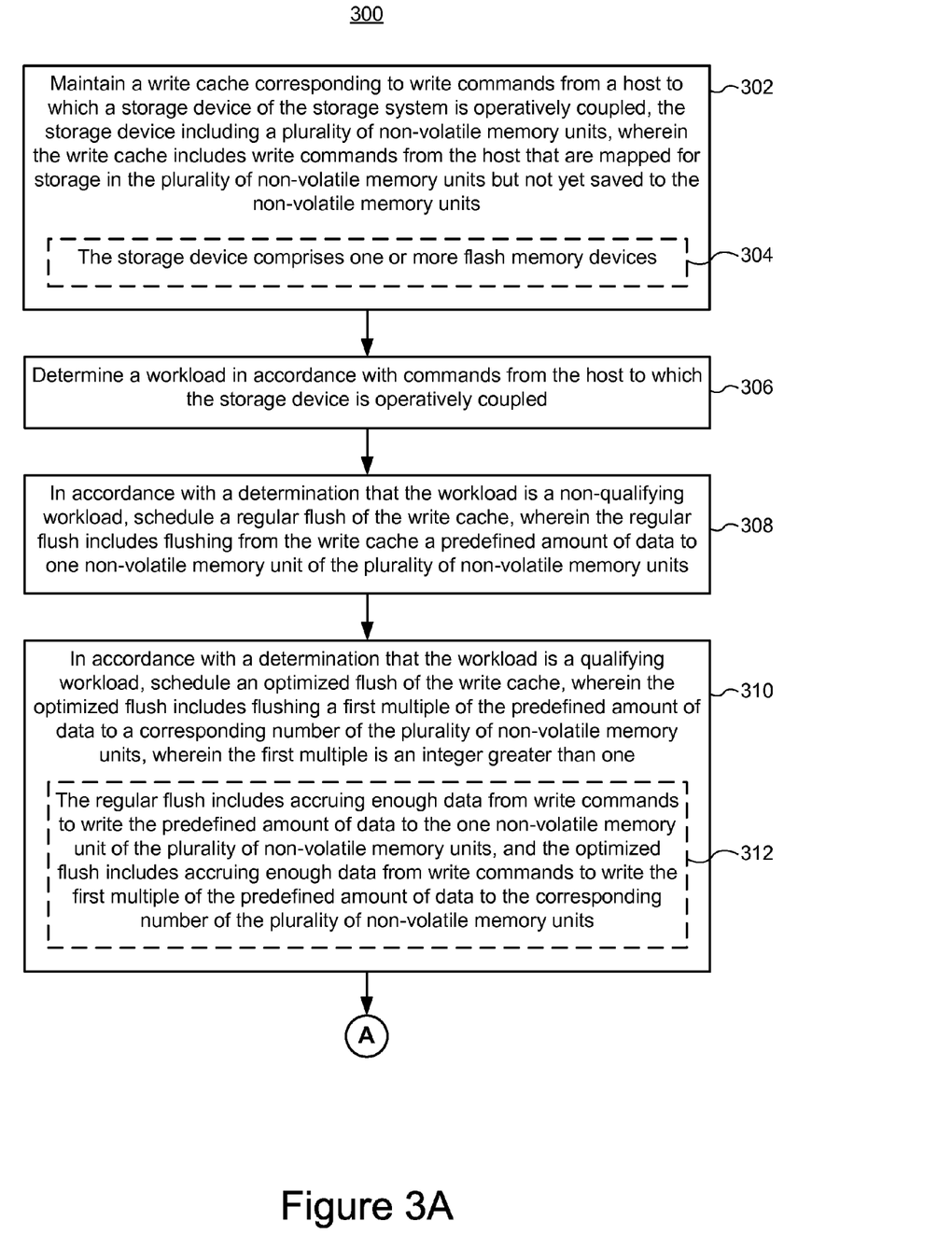
FIGS. 3A-3B illustrate a flowchart representation of a method of managing a storage system, in accordance with some embodiments.
Figure 3B:
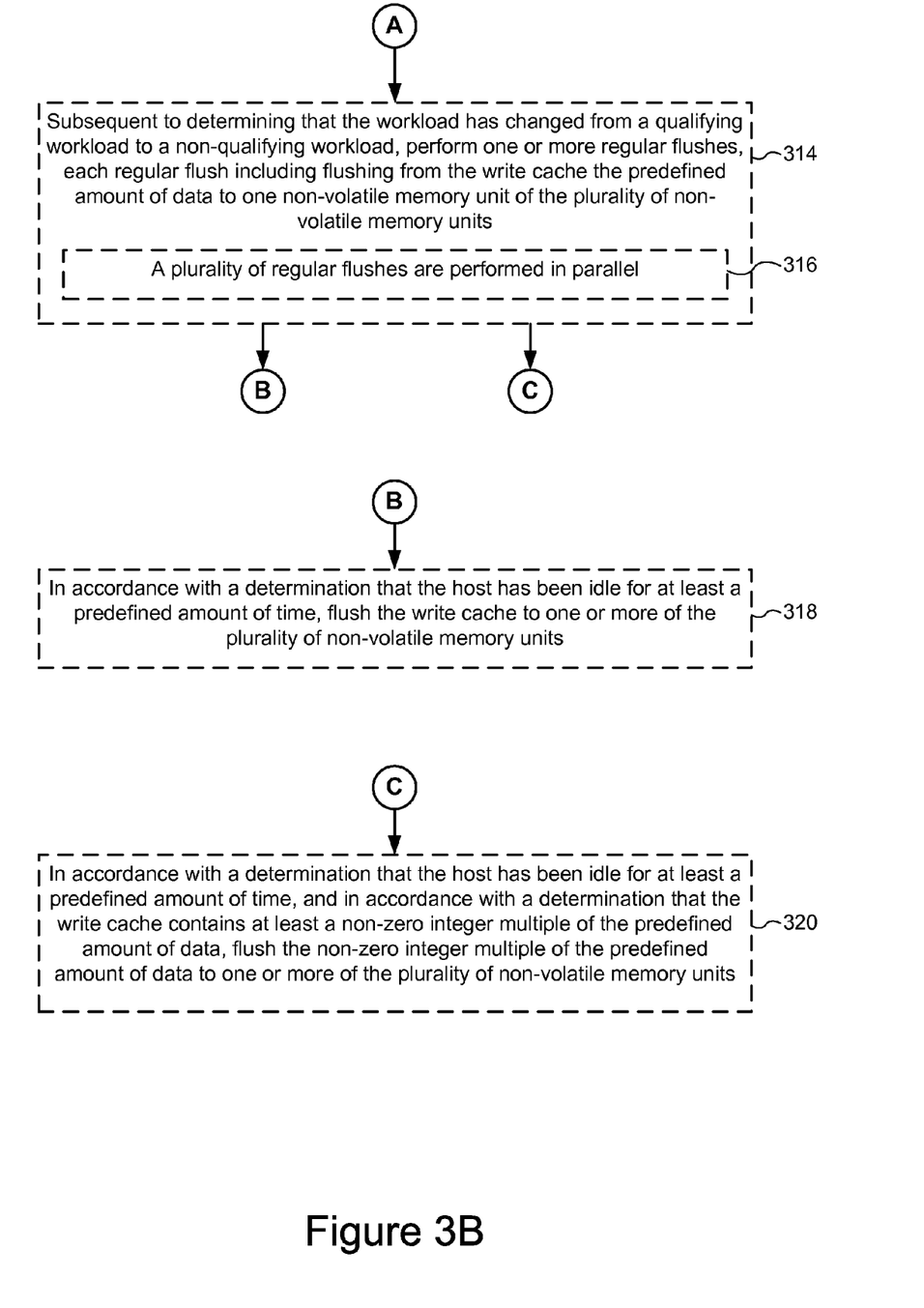

FIGS. 3A-3B illustrate a flowchart representation of a method 300 of managing a storage system, in accordance with some embodiments. At least in some embodiments, method 300 is performed by a storage device (e.g., storage device 120, FIG. 1) or one or more components of the storage device (e.g., storage controller 124, NVM controllers 130 and/or NVM devices 140, 142, FIG. 1), wherein the storage device is operatively coupled with a host system (e.g., computer system 110, FIG. 1). In some embodiments, method 300 is governed by instructions that are stored in a non-transitory computer readable storage medium and that are executed by one or more processors of a device, such as the one or more processing units (CPUs) 122-1 of management module 121-1, shown in FIGS. 1 and 2. In some embodiments, method 300 is performed by a storage system (e.g., data storage system 100, FIG. 1) or one or more components of the storage system (e.g., computer system 110 and/or storage device 120, FIG. 1). In some embodiments, some of the operations of method 300 are performed at a host (e.g., computer system 110, FIG. 1) and information is transmitted to a storage device (e.g., storage device 120, FIG. 1). In some embodiments, method 300 is governed, at least in part, by instructions that are stored in a non-transitory computer readable storage medium and that are executed by one or more processors of a host (not shown in FIG. 1). For ease of explanation, the following describes method 300 as performed by a storage device (e.g., storage device 120, FIG. 1). However, those skilled in the art will appreciate that in other embodiments, one or more of the operations described in method 300 are performed by a host (e.g., computer system 110, FIG. 1).

A storage device (e.g., storage device 120, FIG. 1) of a storage system (e.g., data storage system 100, FIG. 1) maintains (302) a write cache (e.g., write cache 228, FIG. 2) corresponding to write commands from a host (e.g., computer system 110, FIG. 1) to which the storage device is operatively coupled, the storage device including a plurality of non-volatile memory units (e.g., NVM devices 140, 142, FIG. 1), wherein the write cache includes write commands from the host that are mapped for storage in the plurality of non-volatile memory units but not yet saved to the non-volatile memory units. In some embodiments, a non-volatile memory unit of the plurality of non-volatile memory units includes a die (e.g., a flash memory die). In some embodiments, a non-volatile memory unit of the plurality of non-volatile memory units includes a chip (e.g., a flash memory chip having two or more flash memory die). In some embodiments, a non-volatile memory unit of the plurality of non-volatile memory units includes a memory unit that can be programmed in parallel with other memory units (e.g., a plane). In some embodiments, a write cache module (e.g., write cache module 228, FIG. 2) is used to maintain a write cache corresponding to write commands from a host to which a storage device of the storage system is operatively coupled, the storage device including a plurality of non-volatile memory units, wherein the write cache includes write commands from the host that are mapped for storage in the plurality of non-volatile memory units but not yet saved to the non-volatile memory units, as described above with respect to FIG. 2.

In some embodiments, the storage device includes (304) one or more flash memory devices. In some embodiments, the storage device includes a storage medium (e.g., NVM devices 140, 142, FIG. 1), and the storage medium includes one or more non-volatile storage devices, such as flash memory devices. In some embodiments, the storage medium is a single flash memory device, while in other embodiments the storage medium includes a plurality of flash memory devices. For example, in some embodiments, the storage medium includes dozens or hundreds of flash memory devices, organized in parallel memory channels, such as 16, 32 or 64 flash memory devices per memory channel, and 8, 16 or 32 parallel memory channels. In some embodiments, the non-volatile storage medium (e.g., NVM devices 140, 142, FIG. 1) includes NAND-type flash memory or NOR-type flash memory. In other embodiments, the storage medium comprises one or more other types of non-volatile storage devices.

The storage device determines (306) a workload in accordance with commands from the host to which the storage device is operatively coupled. In some embodiments, the workload is determined in accordance with a queue depth of outstanding commands from the host. In some embodiments, the workload is determined in accordance with a percentage of write commands from the host in relation to a percentage of read commands from the host. In some embodiments, a workload module (e.g., workload module 224, FIG. 2) is used to determine a workload in accordance with commands from the host to which the storage device is operatively coupled, as described above with respect to FIG. 2.

The storage device schedules (308), in accordance with a determination that the workload is a non-qualifying workload, a regular flush of the write cache, wherein the regular flush includes flushing from the write cache a predefined amount of data (e.g., a block of data) to one non-volatile memory unit (e.g., NVM device 140-1, FIG. 1) of the plurality of non-volatile memory units (NVM devices 140, 142, FIG. 1). In some embodiments, a non-qualifying workload is when the queue depth is greater than a predefined depth threshold. For example, in some embodiments, a non-qualifying workload is when the queue depth is greater than 32. In some embodiments, a non-qualifying workload is when the percentage of write commands in relation to the percentage of read commands from the host is higher than a predefined threshold. In some embodiments, a write cache module (e.g., write cache module 226, FIG. 2) is used to schedule, in accordance with a determination that the workload is a non-qualifying workload, a regular flush of the write cache, wherein the regular flush includes flushing from the write cache a predefined amount of data to one non-volatile memory unit of the plurality of non-volatile memory units, as described above with respect to FIG. 2.

The storage device schedules (310) in accordance with a determination that the workload is a qualifying workload, an optimized flush of the write cache, wherein the optimized flush includes flushing a first multiple of the predefined amount of data to a corresponding number of the plurality of non-volatile memory units, wherein the first multiple is an integer greater than one. For example, in some embodiments, an optimized flush of the write cache includes flushing n blocks of data to n non-volatile memory units (e.g., flushing one block of data to each of NVM device 140-1, NVM device 140-2, . . . NVM device 140-n). In some embodiments, the first multiple is an integer greater than 7 (i.e., 8 or greater), and typically has a value between 8 and 32. In some embodiments, a qualifying workload is when the queue depth is less than or equal to a predefined depth threshold. For example, in some embodiments, a qualifying workload is when the queue depth is "low" (e.g., queue depth of 1 through 32). In some embodiments, a write cache module (e.g., write cache module 226, FIG. 2) is used to schedule, in accordance with a determination that the workload is a qualifying workload, an optimized flush of the write cache, wherein the optimized flush includes flushing a first multiple of the predefined amount of data to a corresponding number of the plurality of non-volatile memory units, wherein the first multiple is an integer greater than one, as described above with respect to FIG. 2.

In some embodiments, the regular flush includes (312) accruing enough data from write commands to write the predefined amount of data to the one non-volatile memory unit of the plurality of non-volatile memory units, and the optimized flush includes accruing enough data from write commands to write the first multiple of the predefined amount of data to the corresponding number of the plurality of non-volatile memory units. For example, in some embodiments, the regular flush includes accruing enough data from write commands to write a block of data to the one non-volatile memory unit and the optimized flush includes accruing enough data from write commands to write n blocks of data to n non-volatile memory units, where n is an integer greater than one. In some embodiments, the corresponding number is equal to the first multiple, or the corresponding number is equal to the first multiple divided by an integer power of two (e.g., if two or more portions of the non-volatile memory unit can be programmed in parallel).

In some embodiments, the storage device performs (314), subsequent to determining that the workload has changed from a qualifying workload to a non-qualifying workload, one or more regular flushes, each regular flush including flushing from the write cache the predefined amount of data to one non-volatile memory unit of the plurality of non-volatile memory units. In some embodiments, a write cache module (e.g., write cache module 226, FIG. 2) is used to perform, subsequent to determining that the workload has changed from a qualifying workload to a non-qualifying workload, one or more regular flushes, each regular flush including flushing from the write cache the predefined amount of data to one non-volatile memory unit of the plurality of non-volatile memory units, as described above with respect to FIG. 2.

In some embodiments, performing the one or more regular flushes (314) includes performing (316) a plurality of regular flushes in parallel (316). In some embodiments or in some circumstances, all of the regular flushes performed in operation 314 are performed in parallel. In some embodiments, performing multiple write cache flushes "in parallel" is defined to mean performing the multiple write cache during at least partially overlapping times.

Optionally, in some embodiments, the storage device flushes (318), in accordance with a determination that the host has been idle for at least a predefined amount of time, the write cache to one or more of the plurality of non-volatile memory units. In some embodiments, in accordance with a determination that the host has been idle for at least a predefined amount of time, the storage device performs a regular flush. In some embodiments, or in some circumstances (e.g., where the write cache stores sufficient data to perform an optimized flush), in accordance with a determination that the host has been idle for at least a predefined amount of time, the storage device performs an optimized flush. In some embodiments, in accordance with a determination that the host has been idle for at least a predefined amount of time, the storage device flushes an entirety of the write cache to one or more of the plurality of non-volatile memory units. In some embodiments, a write cache module (e.g., write cache module 226, FIG. 2) is used to flush, in accordance with a determination that the host has been idle for at least a predefined amount of time, the write cache to one or more of the plurality of non-volatile memory units, as described above with respect to FIG. 2.

Optionally, in some embodiments, the storage device flushes (320), in accordance with a determination that the host has been idle for at least a predefined amount of time, and in accordance with a determination that the write cache contains at least a non-zero integer multiple of the predefined amount of data, the non-zero integer multiple of the predefined amount of data to one or more of the plurality of non-volatile memory units. For example, in some embodiments, if the write cache contains two and a half blocks worth of data, the storage device flushes two blocks of data to one or more of the plurality of non-volatile memory units. In some embodiments, a write cache module (e.g., write cache module 226, FIG. 2) is used to flush, in accordance with a determination that the host has been idle for at least a predefined amount of time, and in accordance with a determination that the write cache contains at least a non-zero integer multiple of the predefined amount of data, the non-zero integer multiple of the predefined amount of data to one or more of the plurality of non-volatile memory units, as described above with respect to FIG. 2.

It will be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the phrase "at least one of A, B and C" is to be construed to require one or more of the listed items, and this phase reads on a single instance of A alone, a single instance of B alone, or a single instance of C alone, while also encompassing combinations of the listed items such "one or more of A and one or more of B without any of C," and the like.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of managing a storage system, the method comprising:
   maintaining a write cache corresponding to write commands from a host to which a storage device of the storage system is operatively coupled, the storage device including a plurality of non-volatile memory units, wherein the write cache includes write commands from the host that are mapped for storage in the plurality of non-volatile memory units but not yet saved to the non-volatile memory units;
   determining a workload in accordance with commands from the host to which the storage device is operatively coupled;
   in accordance with a determination that the workload is a non-qualifying workload, scheduling a regular flush of the write cache, wherein the regular flush includes flushing from the write cache a predefined amount of data to one non-volatile memory unit of the plurality of non-volatile memory units; and
   in accordance with a determination that the workload is a qualifying workload, scheduling an optimized flush of the write cache, wherein the optimized flush includes flushing a first multiple of the predefined amount of data to a corresponding number of the plurality of non-volatile memory units, wherein the first multiple is an integer greater than one;
   wherein determining the workload includes determining a queue depth of outstanding commands from the host and the determination that the workload is a qualifying workload comprises a determination that the queue depth is less than a predefined threshold.

2. The method of claim 1, wherein the regular flush includes accruing enough data from write commands to write the predefined amount of data to the one non-volatile memory unit of the plurality of non-volatile memory units, and the optimized flush includes accruing enough data from write commands to write the first multiple of the predefined amount of data to the corresponding number of the plurality of non-volatile memory units.

3. The method of claim 1, further comprising, subsequent to determining that the workload has changed from a qualifying workload to a non-qualifying workload, performing a plurality of regular flushes in parallel, each regular flush including flushing from the write cache the predefined amount of data to one non-volatile memory unit of the plurality of non-volatile memory units, wherein performing the plurality of regular flushes in parallel includes flushing from the write cache to the corresponding number of the plurality of non-volatile memory units in parallel.

4. The method of claim 1, wherein each non-volatile memory unit of the plurality of non-volatile memory units includes one or more non-volatile memory die or a non-volatile memory chip.

5. The method of claim 1, further comprising, in accordance with a determination that the host has been idle for at least a predefined amount of time, flushing the write cache to one or more of the plurality of non-volatile memory units.

6. The method of claim 1, further comprising, in accordance with a determination that the host has been idle for at least a predefined amount of time, and in accordance with a determination that the write cache contains at least a non-zero integer multiple of the predefined amount of data, flushing the non-zero integer multiple of the predefined amount of data to one or more of the plurality of non-volatile memory units.

7. The method of claim 1, wherein the storage device comprises one or more flash memory devices.

8. A storage system, comprising:
   non-volatile memory;
   one or more processors; and
   controller memory storing one or more programs configured for execution by the one or more processors, the one or more programs including instructions for:
      maintaining a write cache corresponding to write commands from a host to which a storage device of the storage system is operatively coupled, the storage device including a plurality of non-volatile memory units, wherein the write cache includes write commands from the host that are mapped for storage in the plurality of non-volatile memory units but not yet saved to the non-volatile memory units;
      determining a workload in accordance with commands from the host to which the storage device is operatively coupled;
      in accordance with a determination that the workload is a non-qualifying workload, scheduling a regular flush of the write cache, wherein the regular flush includes flushing from the write cache a predefined amount of data to one non-volatile memory unit of the plurality of non-volatile memory units; and
      in accordance with a determination that the workload is a qualifying workload, scheduling an optimized flush of the write cache, wherein the optimized flush includes flushing a first multiple of the predefined amount of data to a corresponding number of the plurality of non-volatile memory units, wherein the first multiple is an integer greater than one;
wherein determining the workload includes determining a queue depth of outstanding commands from the host and the determination that the workload is a qualifying workload comprises a determination that the queue depth is less than a predefined threshold.

9. The storage system of claim 8, wherein the regular flush includes accruing enough data from write commands to write the predefined amount of data to the one non-volatile memory unit of the plurality of non-volatile memory units, and the optimized flush includes accruing enough data from write commands to write the first multiple of the predefined amount of data to the corresponding number of the plurality of non-volatile memory units.

10. The storage system of claim 8, the one or more programs further including instructions for, subsequent to determining that the workload has changed from a qualifying workload to a non-qualifying workload, performing a plurality of regular flushes in parallel, each regular flush including flushing from the write cache the predefined amount of data to one non-volatile memory unit of the plurality of non-volatile memory units, wherein performing the plurality of regular flushes in parallel includes flushing from the write cache to the corresponding number of the plurality of non-volatile memory units in parallel.

11. The storage system of claim 8, wherein each non-volatile memory unit of the plurality of non-volatile memory units includes one or more non-volatile memory die or a non-volatile memory chip.

12. The storage system of claim 8, the one or more programs further including instructions for, in accordance with a determination that the host has been idle for at least a predefined amount of time, flushing the write cache to one or more of the plurality of non-volatile memory units.

13. The storage system of claim 8, the one or more programs further including instructions for, in accordance with a determination that the host has been idle for at least a predefined amount of time, and in accordance with a determination that the write cache contains at least a non-zero integer multiple of the predefined amount of data, flushing the non-zero integer multiple of the predefined amount of data to one or more of the plurality of non-volatile memory units.

14. The storage system of claim 8, wherein the storage device comprises one or more flash memory devices.

15. A non-transitory computer-readable storage medium, storing one or more programs configured for execution by one or more processors of a storage system, the one or more programs including instructions for:
maintaining a write cache corresponding to write commands from a host to which a storage device of the storage system is operatively coupled, the storage device including a plurality of non-volatile memory units, wherein the write cache includes write commands from the host that are mapped for storage in the plurality of non-volatile memory units but not yet saved to the non-volatile memory units;
determining a workload in accordance with commands from the host to which the storage device is operatively coupled;
in accordance with a determination that the workload is a non-qualifying workload, scheduling a regular flush of the write cache, wherein the regular flush includes flushing from the write cache a predefined amount of data to one non-volatile memory unit of the plurality of non-volatile memory units; and
in accordance with a determination that the workload is a qualifying workload, scheduling an optimized flush of the write cache, wherein the optimized flush includes flushing a first multiple of the predefined amount of data to a corresponding number of the plurality of non-volatile memory units, wherein the first multiple is an integer greater than one;
wherein determining the workload includes determining a queue depth of outstanding commands from the host and the determination that the workload is a qualifying workload comprises a determination that the queue depth is less than a predefined threshold.

16. The storage medium of claim 15, wherein the regular flush includes accruing enough data from write commands to write the predefined amount of data to the one non-volatile memory unit of the plurality of non-volatile memory units, and the optimized flush includes accruing enough data from write commands to write the first multiple of the predefined amount of data to the corresponding number of the plurality of non-volatile memory units.

17. The storage medium of claim 15, the one or more programs further including instructions for, subsequent to determining that the workload has changed from a qualifying workload to a non-qualifying workload, performing a plurality of regular flushes in parallel, each regular flush including flushing from the write cache the predefined amount of data to one non-volatile memory unit of the plurality of non-volatile memory units, wherein performing the plurality of regular flushes in parallel includes flushing from the write cache to the corresponding number of the plurality of non-volatile memory units in parallel.

18. The storage medium of claim 15, wherein each non-volatile memory unit of the plurality of non-volatile memory units includes one or more non-volatile memory die or a non-volatile memory chip.

19. The storage medium of claim 15, the one or more programs further including instructions for, in accordance with a determination that the host has been idle for at least a predefined amount of time, flushing the write cache to one or more of the plurality of non-volatile memory units.

20. The storage medium of claim 15, the one or more programs further including instructions for, in accordance with a determination that the host has been idle for at least a predefined amount of time, and in accordance with a determination that the write cache contains at least a non-zero integer multiple of the predefined amount of data, flushing the non-zero integer multiple of the predefined amount of data to one or more of the plurality of non-volatile memory units.

21. The storage medium of claim 15, wherein the storage device comprises one or more flash memory devices.

* * * * *